(12) United States Patent
Fujita et al.

(10) Patent No.: US 8,537,764 B2
(45) Date of Patent: Sep. 17, 2013

(54) BASE STATION AND MOBILE STATION

(75) Inventors: Hiroshi Fujita, Kawasaki (JP); Taiji Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 12/795,891

(22) Filed: Jun. 8, 2010

(65) Prior Publication Data
US 2010/0322170 A1 Dec. 23, 2010

(30) Foreign Application Priority Data

Jun. 18, 2009 (JP) .................. 2009-145787

(51) Int. Cl.
*H04W 4/00* (2009.01)
(52) U.S. Cl.
USPC ....................................... 370/329
(58) Field of Classification Search
USPC ......... 370/203, 204–215, 229–240, 310–337, 370/338–350, 395.1, 395.3, 395.4, 395.41, 370/395.42, 395.5, 395.52, 395.53, 412–421, 370/431–457, 458–463, 464–497, 498–522, 370/523–520, 521–529
See application file for complete search history.

(56) References Cited

U.S. PATENT DOCUMENTS

| | | | |
|---|---|---|---|
| 2006/0146948 A1* | 7/2006 | Park et al. ............... | 375/260 |
| 2006/0209732 A1* | 9/2006 | Gorokhov et al. ........ | 370/310 |
| 2007/0254685 A1 | 11/2007 | Oketani et al. | |
| 2007/0293233 A1* | 12/2007 | Inoue et al. ............. | 455/450 |
| 2010/0208664 A1* | 8/2010 | Nishio et al. ............ | 370/329 |
| 2010/0322170 A1* | 12/2010 | Fujita et al. ............. | 370/329 |
| 2011/0149947 A1* | 6/2011 | Kim et al. ............... | 370/350 |

FOREIGN PATENT DOCUMENTS

JP    2007-300316    11/2007

* cited by examiner

*Primary Examiner* — Jung-Jen Liu
(74) *Attorney, Agent, or Firm* — Fujitsu Patent Center

(57) ABSTRACT

A base station includes an identifying unit that identifies a group to which a mobile station that is to start communication belongs; a determining unit that determines a second pilot signal, which is allocated to the group identified by the identifying unit, to be a pilot signal for communication with the mobile station; and a transmitting unit that transmits information for identifying the second pilot signal to the mobile station by using a first pilot signal determined beforehand for each group as a pilot signal for notifying the information.

7 Claims, 8 Drawing Sheets

BASE STATION AND MOBILE STATION

CROSS-REFERENCE TO RELATED APPLICATION(S)

This application is based upon and claims the benefit of priority of the prior Japanese Patent Application No. 2009-145787, filed on Jun. 18, 2009, the entire contents of which are incorporated herein by reference.

FIELD

The embodiment discussed herein is directed to a base station and a mobile station.

BACKGROUND

Conventionally, a technology for performing channel estimation with known signals called pilot signals and demodulating received data based on a result of the channel estimation has been introduced. Furthermore, for a cellular wireless communication system, a technology for using a different pilot signal for each base station has been proposed to prevent the possibility that received data may not normally be demodulated due to interference between pilot signals transmitted from adjacent base stations.

Such a technology is disclosed in for example Japanese Laid-open Patent Publication No. 2007-300316.

However, in the above-mentioned conventional cellular wireless communication system, because an identical pilot signal is used in each cell, there is a problem in that data transmitted and received by a mobile station may relatively easily be demodulated by other mobile stations located in the same cell.

When highly-confidential information is wirelessly transmitted and received, it may be possible to perform communication after performing encryption to prevent information leakage. However, the encryption is performed in a higher layer than a physical layer, and, in the physical layer at the lower level, a process for demodulating the encrypted data and transmitting the data with insertion of a pilot signal is performed. Therefore, the pilot signal itself is not encrypted and a third-party mobile station located in the same cell can demodulate the encrypted data, so that the information may be deciphered afterward.

SUMMARY

According to an aspect of an embodiment of the invention, a base station includes an identifying unit that identifies a group to which a mobile station that is to start communication belongs; a determining unit that determines a second pilot signal, which is allocated to the group identified by the identifying unit, to be a pilot signal for communication with the mobile station; and a transmitting unit that transmits information for identifying the second pilot signal to the mobile station by using a first pilot signal determined beforehand for each group as a pilot signal for notifying the information.

According to another aspect of an embodiment of the invention, a mobile station includes a demodulating unit that demodulates received data based on a first pilot signal; an acquiring unit that acquires information related to a pilot signal from the data demodulated by the demodulating unit; and a pilot allocating unit that changes the first pilot signal, which is used for demodulating the received data by the demodulating unit, to a second pilot signal based on the information acquired by the acquiring unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

A preferred embodiment of the present invention will be explained with reference to accompanying drawings. The following embodiment is described with an example using a communication system that employs an OFDMA (Orthogonal Frequency Division Multiplexing Access) as a communication method. However, the present invention is not limited to this example. For example, the present invention can also be applied to a communication system employing a communication method such as an OFDM (Orthogonal Frequency Division Multiplexing) and a CDMA (Code Division Multiple Access) in which a received signal is demodulated based on a pilot signal.

Figure 1:
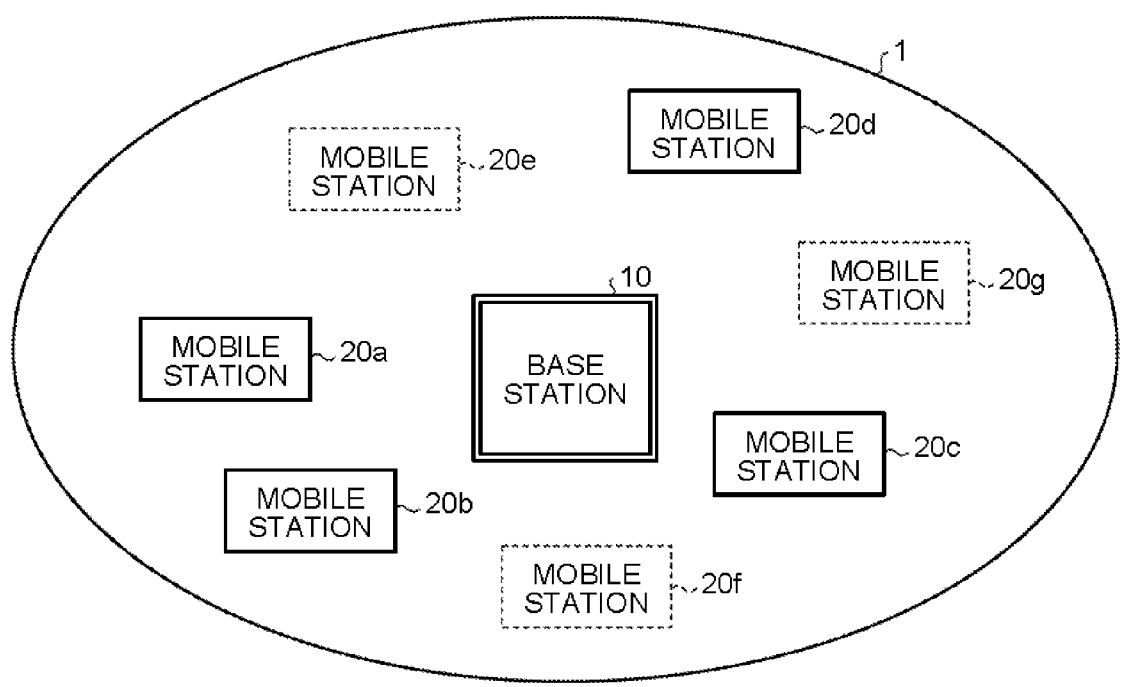
FIG. 1 is a diagram of an example of a wireless network system according to a present embodiment.

An example of a wireless communication system that implements a wireless communication method according to a present embodiment will be described below. FIG. 1 is a diagram of an example of a wireless network system that implements the wireless communication method according to the present embodiment. The wireless network system illustrated in FIG. 1 includes a base station 10 and mobile stations 20a to 20g. In the following description, the mobile stations 20a to 20g may be simply referred to as a mobile station 20 when any of them are not specified.

The base station 10 is a communication device that forms a cell 1. The base station 10 may be configured to be able to perform wired and/or wireless communication with other base stations and the like. The mobile stations 20a to 20g are devices that communicate with other devices via wireless communication with the base station 10.

The mobile stations 20a to 20d are mobile stations belonging to a group A, and perform communication with mobile stations belonging to the group A. The mobile stations 20e to 20g are mobile stations belonging to a group B, and perform communication with mobile stations belonging to the group B. The group A is a group of the mobile stations 20 distributed to firefighters by a fire department for example, and the group B is a group of the mobile stations 20 distributed to police officers by a police department for example.

Figure 2:
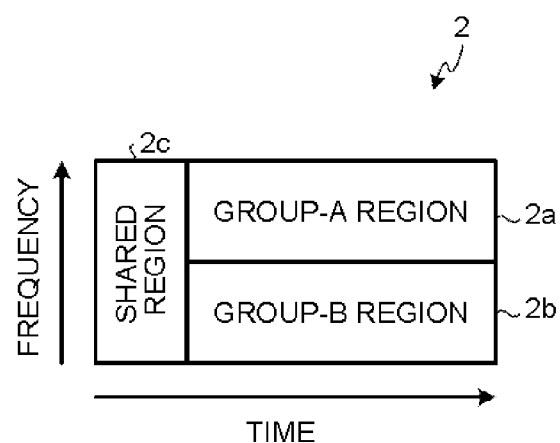
FIG. 2 is a diagram of an example of a frame structure.

An example of a structure of a frame 2 exchanged in wireless communication between the mobile stations 20a to 20g and the base station 10 is illustrated in FIG. 2. As illustrated in FIG. 2, the frame 2 contains a group-A region 2a, a group-B region 2b, and a shared region 2c.

The group-A region 2a is a region for storing information exchanged between the mobile stations 20 belonging to the group A. The group-B region 2b is a region for storing information exchanged between the mobile stations 20 belonging to the group B. The shared region 2c is a region commonly used by all groups, and contains, for example, boundary information indicating a boundary between the successive group-A region 2a and the successive group-B region 2b.

The group-A region 2a contains a pilot signal used by the mobile stations 20 belonging to the group A for demodulating data contained in the group-A region 2a. The group-B region 2b contains a pilot signal used by the mobile stations 20 belonging to the group B for demodulating data contained in the group-B region 2b. In this state, a different pilot signal is contained in each of the group-A region 2a and the group-B region 2b so that the mobile stations 20 belonging to other groups cannot easily demodulate data.

In order that the pilot signal is varied for each group, it is possible to change a pilot sequence for each group or to change a pilot position for each group. It is also possible to change both the pilot sequence and the pilot position for each group.

Figure 3:
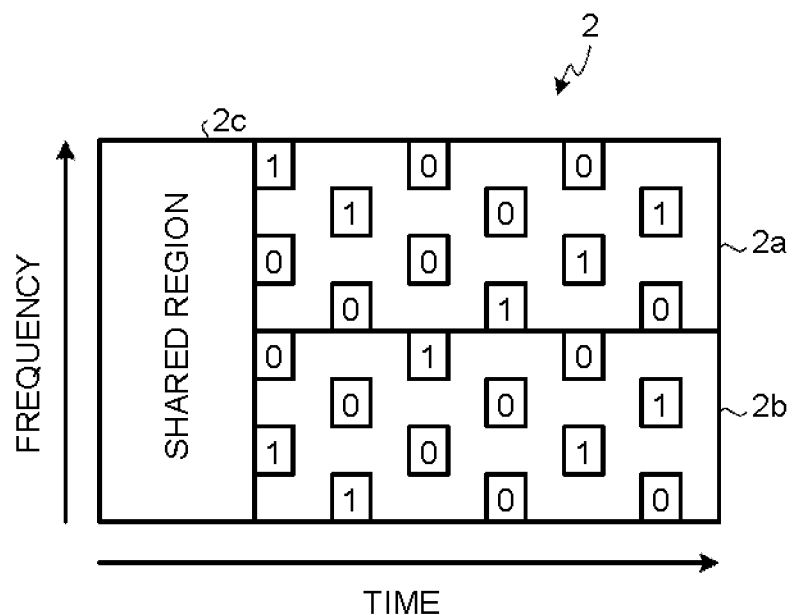
FIG. 3 is a diagram of an example of allocation of a different pilot signal sequence to each group.

An example of a frame structure for allocating a different pilot sequence to each group is illustrated in FIG. 3. In FIG. 3, pilot signals are indicated by "1" and "0" while signals in the pilot sequence for the group A are dispersed in the group-A region 2a and signals in the pilot sequence for the group B are dispersed in the group-B region 2b. Positions at which the signals in the respective pilot sequences are present are identical between the groups. However, patterns of appearance of the signals, i.e., "1" and "0" in FIG. 3, in the respective pilot sequences are different from each other.

In this manner, when a different pilot sequence is allocated to each group and each mobile station is configured to know only a pilot sequence allocated to a belonging group, it becomes difficult to demodulate data of other groups even when a resource such as a frequency band is shared by all groups.

Figure 4:
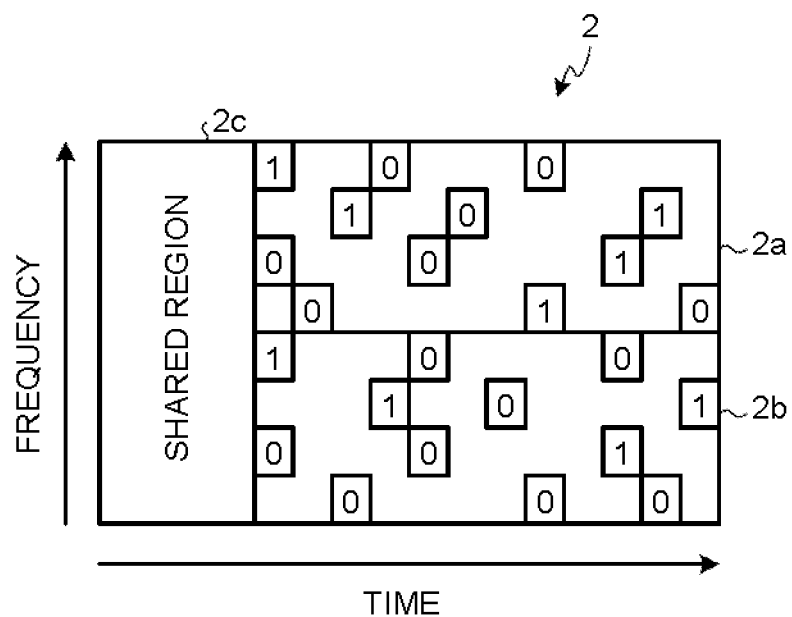
FIG. 4 is a diagram of an example of allocation of a different pilot allocation position to each group.

An example of a frame structure for allocating a different pilot position to each group is illustrated in FIG. 4. In the example illustrated in FIG. 4, pilot sequences allocated to the respective groups are identical to each other, but pilot signal positions are varied between the groups. In case of OFDMA and OFDM communication systems, the pilot signal position can be changed in time or the pilot signal position can be changed in frequency. In case of communication systems other than the OFDMA and the OFDM, the pilot signal position can be changed according to the communication system.

In this manner, when a different pilot position is allocated to each group and each mobile station is configured to know only a pilot position allocated to a belonging group, it becomes difficult to demodulate data of other groups even when a resource such as a frequency band is shared by all groups.

Figure 5:
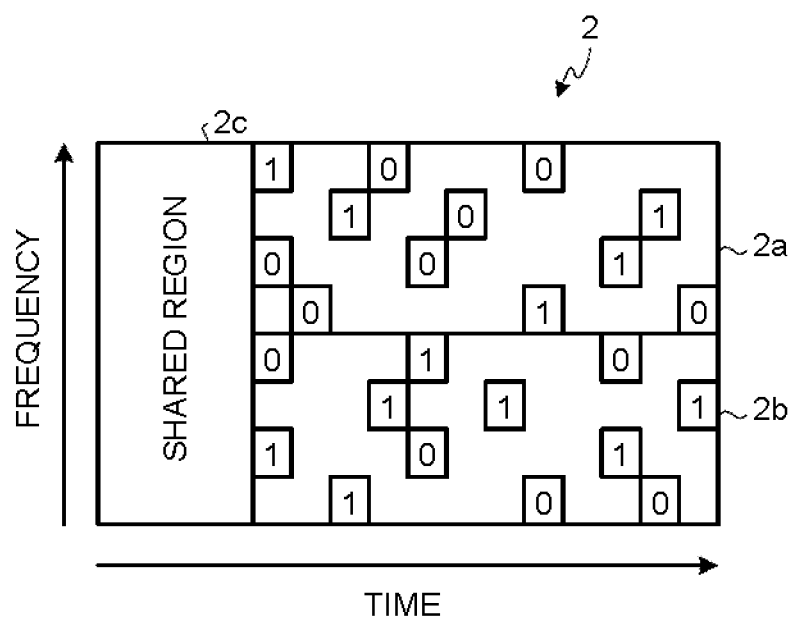
FIG. 5 is a diagram of an example of allocation of a different pilot signal sequence and a different pilot allocation position to each group.

An example of a frame structure for allocating a different pilot sequence and a different pilot position to each group is illustrated in FIG. 5. In the example illustrated in FIG. 5, both the pilot sequence and the pilot position allocated to each group are varied for each group.

In this manner, when a different pilot sequence and a different pilot position are allocated to each group, it becomes difficult to estimate pilot signals allocated to other groups from the pilot signals allocated to a certain group. Therefore, compared to a case where either one of the pilot sequence and the pilot position is varied when they are allocated to each group, it becomes more difficult to demodulate data of other groups.

In FIGS. 3 to 5, an example is illustrated in which a different pilot signal is allocated to each of two groups; however, three ore more groups may share a frame and a different pilot signal may be allocated to each of these groups. It is also possible to allocate a different pilot signal to each mobile station.

Furthermore, region segmentation of the frame illustrated in FIG. 2 is one example. Therefore, regions for respective groups and the shared region may be arranged in an arbitrary manner.

Next, configurations of the base station 10 and the mobile stations 20a to 20g illustrated in FIG. 1 are described. The mobile stations 20a to 20g have identical configurations, so that the configuration of the mobile station 20 will be described as a representative example of the mobile stations 20a to 20g.

Figure 6:
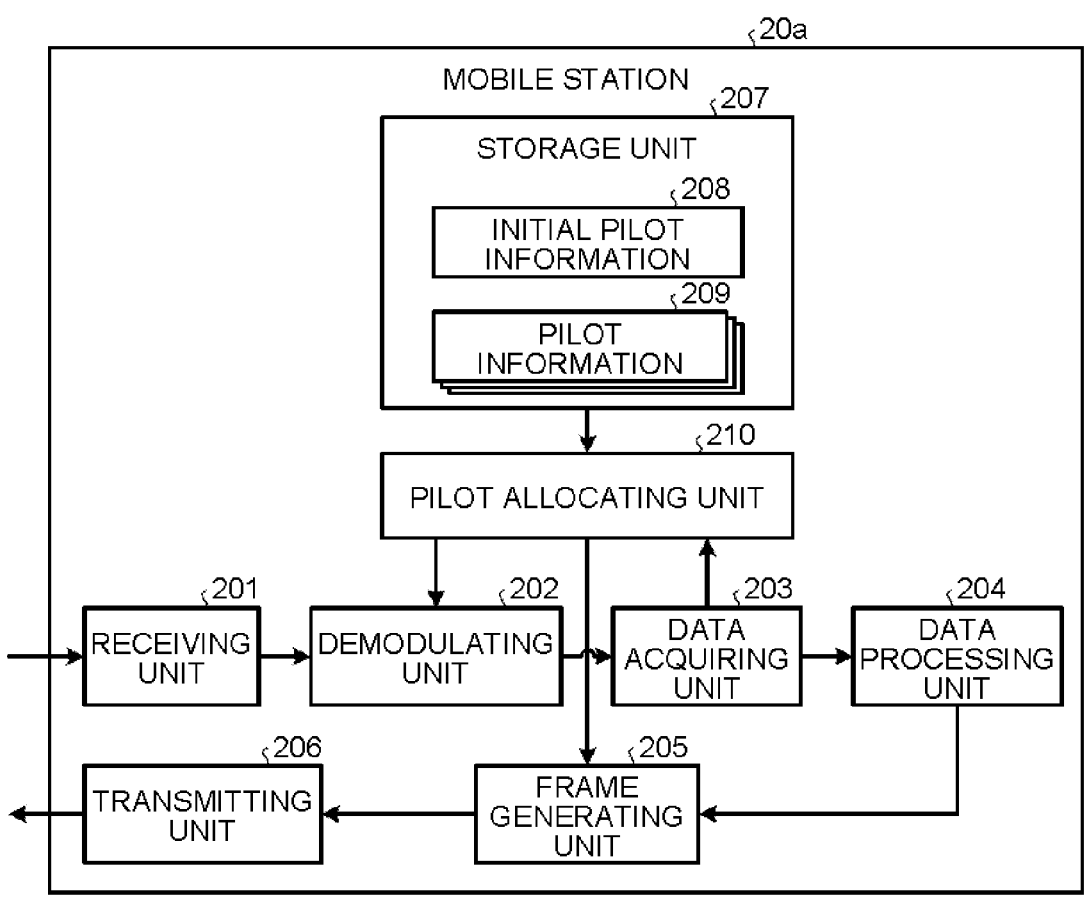
FIG. 6 is a block diagram of a configuration of a mobile station according to the present embodiment.

FIG. 6 is a functional block diagram of a configuration of the mobile station 20a. As illustrated in FIG. 6, the mobile station 20a includes a receiving unit 201, a demodulating unit 202, a data acquiring unit 203, a data processing unit 204, a frame generating unit 205, a transmitting unit 206, a storage unit 207, and a pilot allocating unit 210.

The receiving unit 201 receives a frame structured as illustrated in FIG. 2, and the like. The demodulating unit 202 demodulates received data contained in the frame received by the receiving unit 201. In order to accurately demodulate the received data, the demodulating unit 202 identifies a pilot signal allocated to the mobile station 20a based on pilot information notified by the pilot allocating unit 210 and demodulates the data based on the identified pilot signal.

The pilot information is information for identifying the pilot signal allocated to the mobile station 20a. More specifically, when a different pilot sequence is allocated to each group as illustrated in FIG. 3, the pilot information contains information indicating the pilot sequence allocated to the group to which the mobile station 20a belongs.

Furthermore, when a different pilot position is allocated to each group as illustrated in FIG. 4, the pilot information contains information indicating the pilot position allocated to the group to which the mobile station 20a belongs. Moreover, when a different pilot sequence and a different pilot position are allocated to each group as illustrated in FIG. 5, the pilot information contains information indicating the pilot sequence and the pilot position allocated to the group to which the mobile station 20a belongs.

The data acquiring unit 203 acquires data addressed to the mobile station 20a by performing processing such as decoding of the received data demodulated by the demodulating unit 202. The data acquired by the data acquiring unit 203 contains pilot allocation information for identifying the pilot signal that has been allocated to the mobile station 20a by the base station 10. The pilot allocation information is information indicating what pilot information among pilot information 209 stored in the storage unit 207 should be a basis for identifying the pilot signal allocated to the mobile station 20a.

Examples of the pilot allocation information include an identification number of the pilot information.

The data processing unit 204 performs a predetermined process by using the data acquired by the data acquiring unit 203. The predetermined process in this example is, for example, a telephone call process when the mobile station 20a is a mobile telephone terminal, and a process of displaying electronic mails and WEB pages when the mobile station 20a is an information processing terminal. Furthermore, when it is necessary to transmit data as a result of the predetermined process, the data processing unit 204 outputs to the frame generating unit 205 transmission data being data to be transmitted.

The frame generating unit 205 performs a process of coding, modulating, and the like on the transmission data input from the data processing unit 204 to thereby generate a transmission frame. Furthermore, the frame generating unit 205 identifies the pilot signal allocated to the mobile station 20a based on the pilot information notified by the pilot allocating unit 210, and inserts the identified pilot signal into the frame.

The transmitting unit 206 transmits the frame generated by the frame generating unit 205 to the base station 10.

The storage unit 207 is a storage device for storing various types of information, and stores therein initial pilot information 208 and the pilot information 209. The initial pilot information 208 is known pilot information used for receiving the pilot allocation information transmitted from the base station 10 after connection to the mobile station 20a is started. The pilot information 209 is a group of pieces of the pilot information for identifying respective pilot signals that may possibly be allocated to the group to which the mobile station 20a belongs. The contents of each of the initial pilot information 208 and the pilot information 209 are identical between the groups.

The pilot allocating unit 210 selects pilot information for identifying the pilot signal allocated to the mobile station 20a from the pilot information 209 based on the pilot allocation information acquired from the data acquiring unit 203. Then, the pilot allocating unit 210 notifies the demodulating unit 202 and the frame generating unit 205 of the selected pilot information.

More specifically, when the mobile station 20a starts communicating with the base station 10, the pilot allocating unit 210 notifies the demodulating unit 202 of the initial pilot information 208 to thereby cause the demodulating unit 202 to demodulate the received data based on the pilot signal identified by the initial pilot information 208.

As will be described later, when permitting a connection request from the mobile station 20, the base station 10 transmits the pilot allocation information to the mobile station 20 to notify the mobile station 20 of a pilot signal currently allocated to the group to which the mobile station 20 belongs. At this time, because the mobile station 20 does not know the pilot signal allocated to the group, the base station 10 inserts an allocation-notification pilot signal, which is determined beforehand for each group, into the frame so that the mobile station 20 can normally receive the pilot allocation information. The initial pilot information 208 is used for identifying the allocation-notification pilot signal determined beforehand for each group.

Then, when the data acquiring unit 203 acquires the pilot allocation information, the pilot allocating unit 210 selects pilot information corresponding to the pilot allocation information from the pilot information 209. Then, the pilot allocating unit 210 notifies the demodulating unit 202 and the frame generating unit 205 of the selected pilot information.

Figure 7:
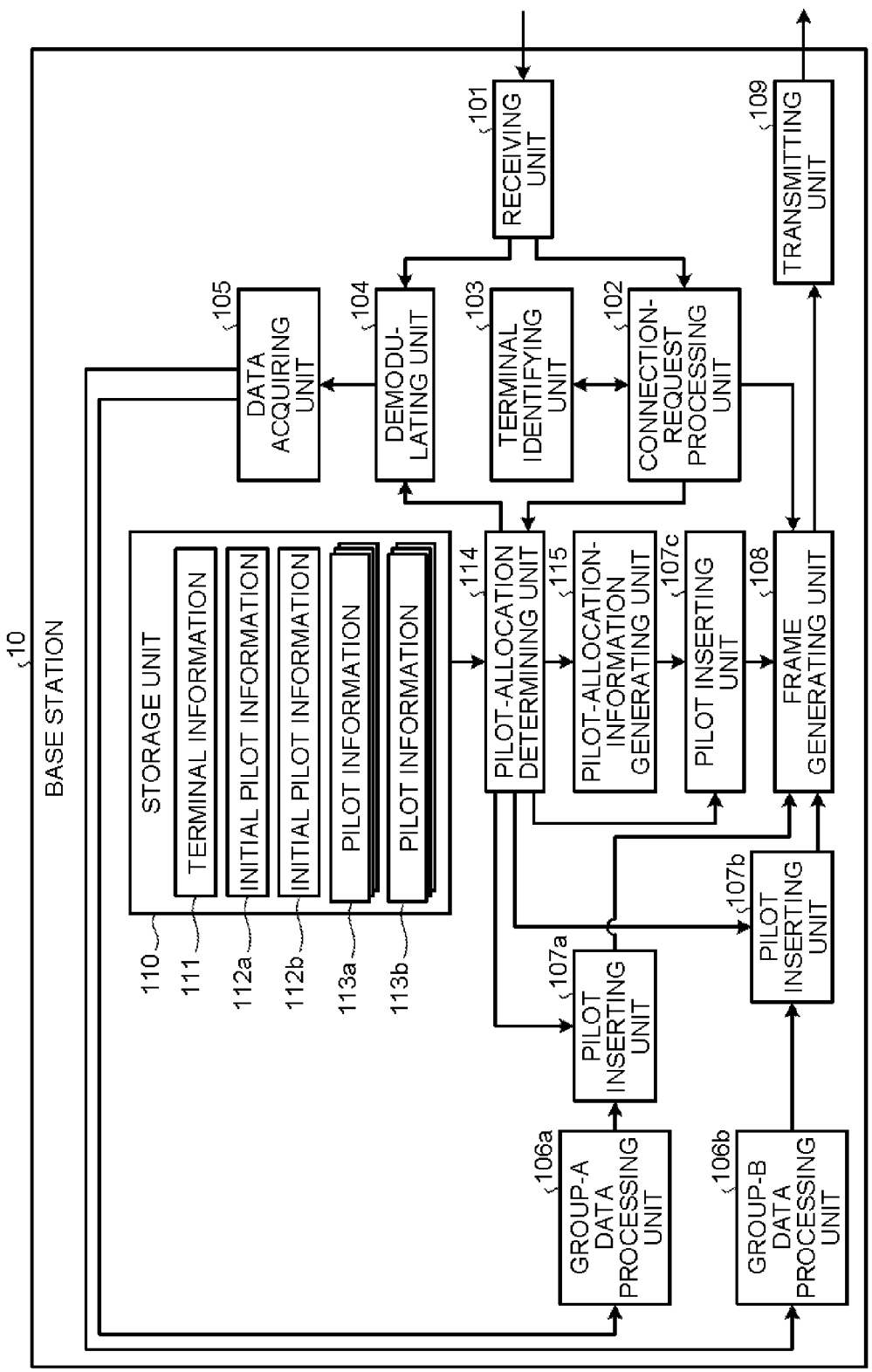
FIG. 7 is a block diagram of a configuration of a base station according to the present embodiment.

FIG. 7 is a functional block diagram of the configuration of the base station 10. As illustrated in FIG. 7, the base station 10 includes a receiving unit 101, a connection-request processing unit 102, a terminal identifying unit 103, a demodulating unit 104, a data acquiring unit 105, a group-A data processing unit 106a, a group-B data processing unit 106b, pilot inserting units 107a to 107c, a frame generating unit 108, a transmitting unit 109, a storage unit 110, a pilot-allocation determining unit 114, and a pilot-allocation-information generating unit 115.

The receiving unit 101 receives a frame structured as illustrate in FIG. 2, a connection request, and the like. The connection-request processing unit 102 determines, when the receiving unit 101 receives a connection request from the mobile station 20, whether or not to permit the connection based on a resource allocation state and the like. When permitting the connection, the connection-request processing unit 102 causes the frame generating unit 108 to return a permission response. Furthermore, when permitting the connection, the connection-request processing unit 102 causes the terminal identifying unit 103 to identify the group to which the mobile station 20 being a source of the request belongs, and requests the pilot-allocation determining unit 114 to give notice of a pilot signal allocated to the identified group.

The demodulating unit 104 demodulates received data contained in the frame received by the receiving unit 101. In order to accurately demodulate the received data, the demodulating unit 104 demodulates the data based on a pilot signal allocated to each group by the pilot-allocation determining unit 114. The data acquiring unit 105 performs a process such as decoding of the received data demodulated by the demodulating unit 104 to thereby acquire data transmitted from the mobile station 20.

The group-A data processing unit 106a performs a predetermined process by using data stored in the group-A region, from among pieces of data acquired by the data acquiring unit 105. Furthermore, when it is necessary to transmit data as a result of the predetermined process, the group-A data processing unit 106a outputs to the pilot inserting unit 107a transmission data being data to be transmitted.

The group-B data processing unit 106b performs a predetermined process by using data stored in the group-B region, from among pieces of data acquired by the data acquiring unit 105. Furthermore, when it is necessary to transmit data as a result of the predetermined process, the group-B data processing unit 106b outputs to the pilot inserting unit 107b transmission data being data to be transmitted.

The base station 10 may be connected to other communication device via a wired network such as a core network. In this case, the group-A data processing unit 106a and the group-B data processing unit 106b perform predetermined processes on data received from the other communication devices via the wired network, and output the data to the pilot inserting unit 107a and the pilot inserting unit 107b, respectively. Furthermore, the group-A data processing unit 106a and the group-B data processing unit 106b perform predetermined processes by using data acquired by the data acquiring unit 105, and transmit the processed data to the other communication devices via the wired network if necessary.

The pilot inserting units 107a to 107c insert a pilot signal into input data, and output the data to the frame generating unit 108. More specifically, the pilot inserting unit 107a inserts a pilot signal allocated to the group A by the pilot-allocation determining unit 114 into the data input from the group-A data processing unit 106a.

Furthermore, the pilot inserting unit 107b inserts a pilot signal allocated to the group B by the pilot-allocation determining unit 114 into the data input from the group-B data processing unit 106b. Moreover, the pilot inserting unit 107c inserts a pilot signal, which is notified by the pilot-allocation determining unit 114 as allocation notice to the mobile station 20 for which the connection request has been approved, into the data input from the pilot-allocation-information generating unit 115.

The frame generating unit 108 performs a process such as coding and modulating on the data input from the pilot inserting units 107a to 107c to thereby generate a frame to be transmitted. The transmitting unit 109 transmits the frame generated by the frame generating unit 108 to the mobile stations 20a to 20g. When the pilot allocation information input from the pilot inserting unit 107c is targeted to the mobile station 20 belonging to the group A, the pilot allocation information is stored in the group-A region 2a, and, when targeted to the mobile station 20 belonging to the group B, it is stored in the group-B region 2b.

The storage unit 110 is a storage device for storing various types of information, and stores therein terminal information 111, initial pilot information 112a and 112b, and pilot information 113a and 113b. The terminal information 111 is information containing correspondence between the mobile station 20 and a group, and is referred to when, for example, the terminal identifying unit 103 identifies the group to which the mobile station 20 belongs.

The initial pilot information 112a is known pilot information used for transmitting pilot allocation information to the mobile station 20 when the mobile station 20 belonging to the group A starts connection, and is the same as the initial pilot information 208 of the mobile station 20 belonging to the group A. The initial pilot information 112b is known pilot information used for transmitting pilot allocation information to the mobile station 20 when the mobile station 20 belonging to the group B starts connection, and is the same as the initial pilot information 208 of the mobile station 20 belonging to the group B.

The pilot information 113a is a group of pieces of the pilot information for identifying respective pilot signals that may possibly be allocated to the group A, and is the same as the pilot information 209 of the mobile station 20 belonging to the group A. The pilot information 113b is a group of pieces of the pilot information for identifying respective pilot signals that may possibly be allocated to the group B, and is the same as the pilot information 209 of the mobile station 20 belonging to the group B.

The pilot-allocation determining unit 114 determines a pilot signal to be allocated to the group A based on the pilot information selected from the pilot information 113a, and notifies the pilot inserting unit 107a of the pilot signal. Furthermore, the pilot-allocation determining unit 114 determines a pilot signal to be allocated to the group B based on the pilot information selected from the pilot information 113b, and notifies the pilot inserting unit 107b of the pilot signal.

Moreover, when receiving a request of notice of the pilot signal from the connection-request processing unit 102, the pilot-allocation determining unit 114 identifies the pilot signal allocated to a grope for which the notice is requested. Then, the pilot-allocation determining unit 114 requests the pilot-allocation-information generating unit 115 to transmit the pilot allocation information for giving notice of the pilot signal to the group for which the notice is requested.

At this time, the pilot-allocation determining unit 114 identifies the pilot signal from the initial pilot information 112a or the initial pilot information 112b depending on the group to which the mobile station 20 belongs so that a newly-connected mobile station 20 can also normally receive the pilot allocation information. Then, the pilot-allocation determining unit 114 instructs the pilot inserting unit 107c to insert the identified pilot signal into a region in which the pilot allocation information is to be stored.

The pilot-allocation-information generating unit 115 generates the pilot allocation information for identifying the pilot signal specified by the pilot-allocation determining unit 114 and outputs the pilot allocation information to the pilot inserting unit 107c.

In this manner, the base station 10 stores pilot information allocated to each group in a region provided for each group, and notifies the pilot information to the newly-connected mobile station 20. Therefore, a risk that information about the pilot signal is leaked to other groups can be reduced.

Figure 8:
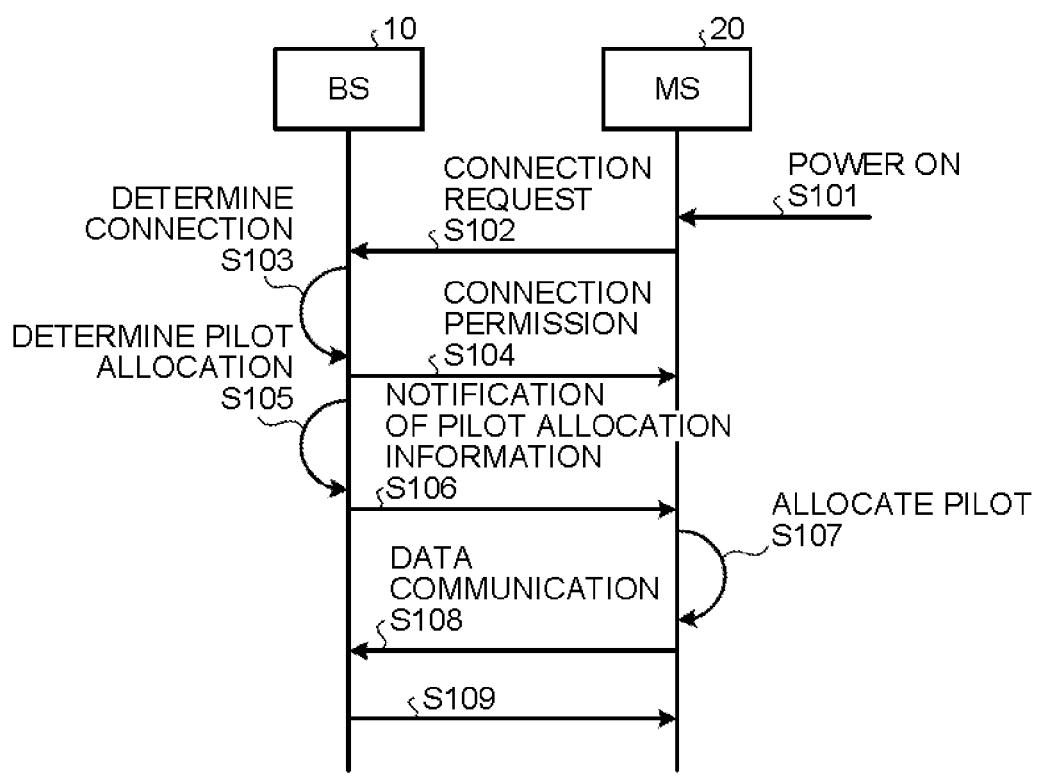
FIG. 8 is a sequence diagram of a process procedure for acquiring pilot allocation information at the time of connection.

Next, operations of the base station 10 and the mobile station 20 are described. FIG. 8 is a sequence diagram of a process procedure for acquiring the pilot allocation information at the time of connection. As illustrated in FIG. 8, when power is turned ON (Step S101), this triggers the mobile station (MS) 20 to transmit a connection request to the base station (BS) 10 (Step S102).

Then, the connection-request processing unit 102 of the base station 10 determines whether or not to permit the connection (Step S103). When the connection is permitted by the determination, the base station 10 returns connection permission to the mobile station 20 (Step S104). Furthermore, the pilot-allocation determining unit 114 determines a pilot signal to be allocated to the mobile station 20 based on a result of identification by the terminal identifying unit 103 (Step S105), and notifies the mobile station 20 of the pilot allocation information (Step S106).

Then, the pilot allocating unit 210 of the mobile station 20 selects from the pilot information 209 pilot information corresponding to the transmitted pilot allocation information, and notifies the demodulating unit 202 and the frame generating unit 205 of the selected pilot information (Step S107).

Thus, data communication is enabled between the newly-connected mobile station 20 and the base station 10 (Steps S108 and S109).

The configurations of the base station 10 and the mobile station 20 described above can be modified in various ways without departing from the technical idea of the present invention. For example, although the base station 10 gives notice of the information about the pilot signal to the mobile station 20 when the mobile station 20 newly starts communication in the above-mentioned example, it is possible to give the same notice when the mobile station 20 is handed over from the other cells.

Furthermore, the base station 10 may change a pilot signal allocated to each group periodically or randomly and may give notice of the information about a pilot signal allocated to each group to which each mobile station 20 belongs, to the mobile station 20 performing communication. With this configuration, it becomes more difficult to estimate the pilot signal allocated to other groups. As a result, it is possible to further improve the confidentiality of the data to be transmitted and received.

To improve the confidentiality, the base station 10 may preferably change the pilot signal allocated to each group randomly.

Figure 9:
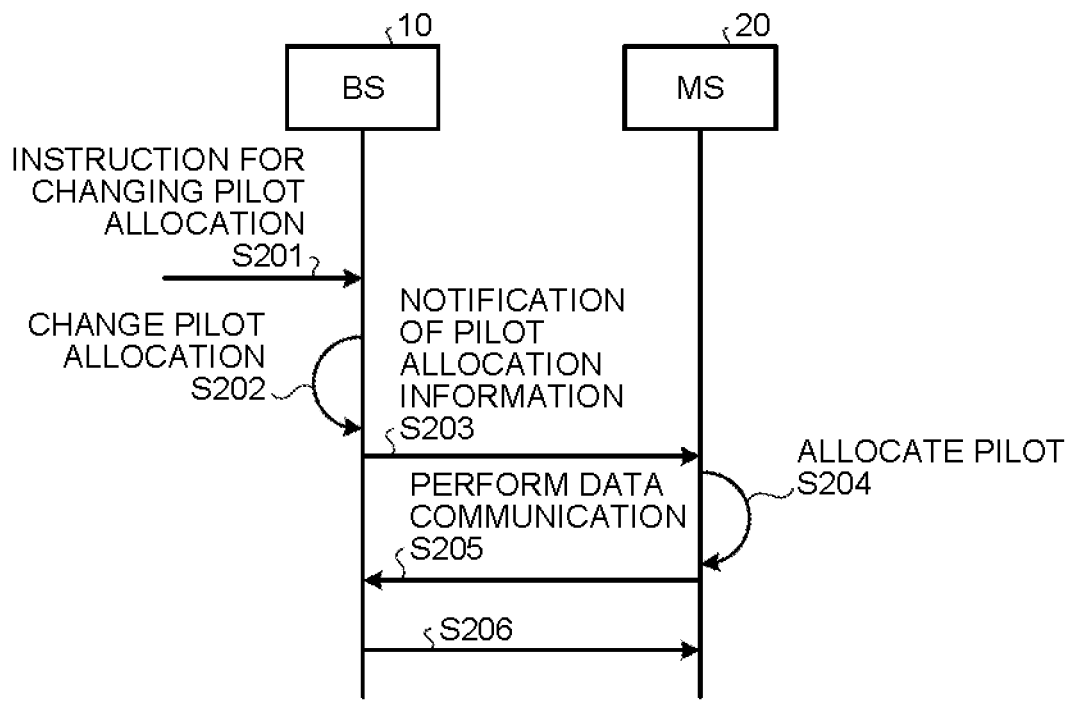
FIG. 9 is a sequence diagram of a process procedure for acquiring pilot allocation information during communication.

A process procedure performed by the base station 10 for changing the pilot signal allocated to each group is illustrated in FIG. 9. As illustrated in FIG. 9, the pilot-allocation determining unit 114 of the base station 10 receives a pilot-allocation change request periodically or randomly (Step S201).

The pilot-allocation change request is issued by a timer means not illustrated in a management apparatus connected to the base station 10 via a network or by a timer means not illustrated in the base station 10.

When receiving the pilot-allocation change request, the pilot-allocation determining unit 114 changes the pilot signal allocated to each group (Step S202). Then, the pilot-allocation determining unit 114 performs operations to transmit the pilot allocation information for giving notice of the changed pilot signal to the mobile station 20 performing communication (Step S203). Because the mobile station 20 performing communication already knows a pilot signal of own group before the change, the pilot allocation information is transmitted by using this pilot signal.

The pilot allocating unit 210 of the mobile station 20 selects pilot information corresponding to the transmitted pilot allocation information from the pilot information 209, and notifies the demodulating unit 202 and the frame generating unit 205 of the selected pilot information (Step S204).

Thus, data communication is enabled between the mobile station 20 performing communication and the base station 10 by using the newly-allocated pilot signal (Steps S205 and S206).

It is possible to transmit the pilot information itself instead of the pilot allocation information to notify the mobile station 20 of the information about the pilot signal from the base station 10.

Figure 10:
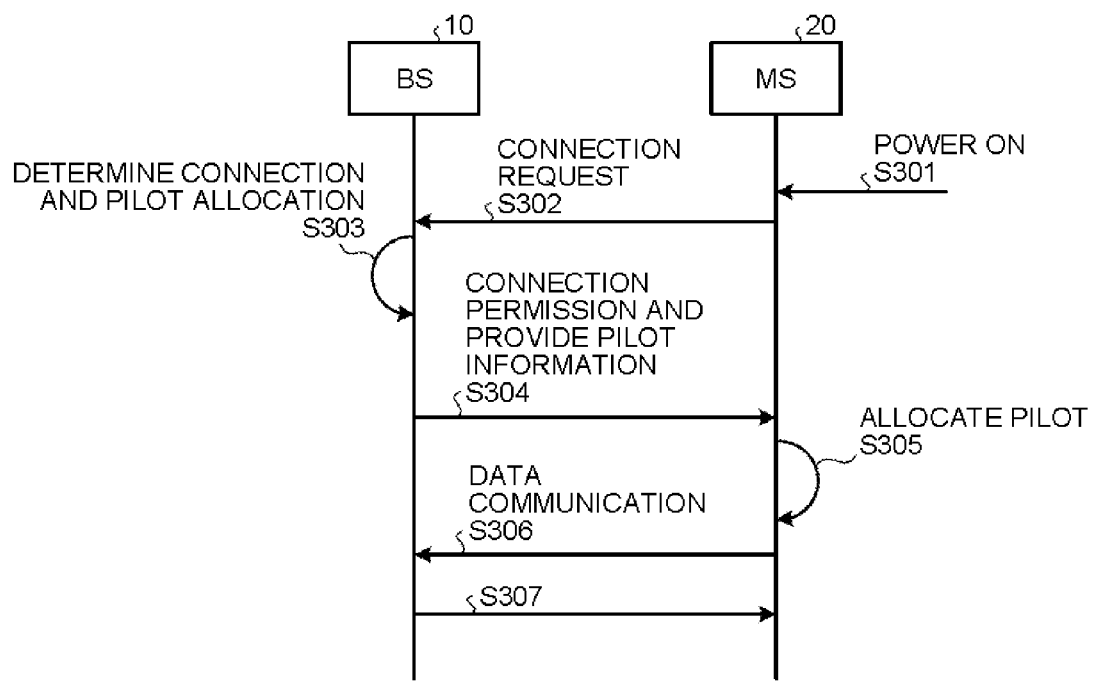
FIG. 10 is a sequence diagram of another example of a process procedure for acquiring pilot allocation information at the time of connection.

A process procedure for transmitting the pilot information itself from the base station 10 to the mobile station 20 is illustrated in FIG. 10. As illustrated in FIG. 10, when power is turned ON (Step S301), this triggers the mobile station 20 to transmit a connection request to the base station 10 (Step S302).

Then, the connection-request processing unit 102 of the base station 10 determines whether or not to permit the connection (Step S303). When the connection is permitted by the determination, the base station 10 returns connection permission to the mobile station 20. Furthermore, the pilot-allocation determining unit 114 of the base station 10 determines a pilot signal to be allocated to the mobile station 20 based on a result of identification by the terminal identifying unit 103, and notifies the mobile station 20 of the pilot information corresponding to the determined pilot signal (Step S304).

Then, the pilot allocating unit 210 of the mobile station 20 notifies the demodulating unit 202 and the frame generating unit 205 of the transmitted pilot information (Step S305).

Thus, data communication is enabled between the newly-connected mobile station 20 and the base station 10 (Steps S306 and S307).

In this manner, when the pilot information itself is notified, the pilot information 209 need not be stored in the mobile station 20. Therefore, storage capacity of the storage unit 207 of the mobile station 20 can be reduced. Furthermore, because the mobile station 20 can allocate arbitrary pilot signals, it is possible to further improve the confidentiality of data to be transmitted and received.

According to an embodiment of the present invention, it is possible to reduce the possibility that information is intercepted by using a pilot signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station comprising:
an identifying unit that identifies a group to which a mobile station that is to start communication belongs;
a determining unit that determines a second pilot signal, which is allocated to the group identified by the identifying unit, to be a pilot signal for communication with the mobile station, the determination unit changing the second pilot signal at random times; and
a transmitting unit that transmits information for identifying the second pilot signal to the mobile station by using a first pilot signal determined beforehand for each group as a pilot signal for notifying the information, the first pilot signal is varied for each group;
wherein when the determining unit changes the second pilot signal allocated to the group to a third pilot signal, the transmitting unit transmits information for identifying the third pilot signal to the mobile station by using the second pilot signal.

2. The base station according to claim 1, wherein
the transmitting unit transmits, as the information for identifying the second pilot signal, information for specifying one piece of information from among pieces of information stored in the mobile station.

3. The base station according to claim 1, wherein
the transmitting unit transmits, as the information for identifying the second pilot signal, information indicating a pilot signal sequence.

4. The base station according to claim 1, wherein
the transmitting unit transmits, as the information for identifying the second pilot signal, information indicating a pilot signal position.

5. A mobile station comprising:
a demodulating unit that demodulates received data based on a first pilot signal;
an acquiring unit that acquires information related to a pilot signal from the data demodulated by the demodulating unit; and
a pilot allocating unit that changes the first pilot signal, which is used for demodulating the received data by the demodulating unit, to a second pilot signal based on the information acquired by the acquiring unit, the first pilot signal is varied for each group, wherein the second pilot signal is changed at random times;
wherein a position of each of the first pilot signal and the second pilot signal is varied for each group to which the mobile station belongs.

6. The mobile station according to claim 5, wherein
a sequence of each of the first pilot signal and the second pilot signal is varied for each group to which the mobile station belongs.

7. A communication method for a base station which communicates with mobile stations, the communication method comprising:
identifying a group to which a mobile station that is to start communication belongs;
determining a second pilot signal, which is allocated to the identified group, to be a pilot signal for communication with the mobile station;
changing the second pilot signal at random times; and
transmitting information for identifying the second pilot signal to the mobile station by using a first pilot signal determined beforehand for each group as a pilot signal for notifying the information, the first pilot signal is varied for each group;

wherein when the determining unit changes the second pilot signal allocated to the group to a third pilot signal, the transmitting unit transmits information for identifying the third pilot signal to the mobile station by using the second pilot signal.

* * * * *